UNITED STATES PATENT OFFICE.

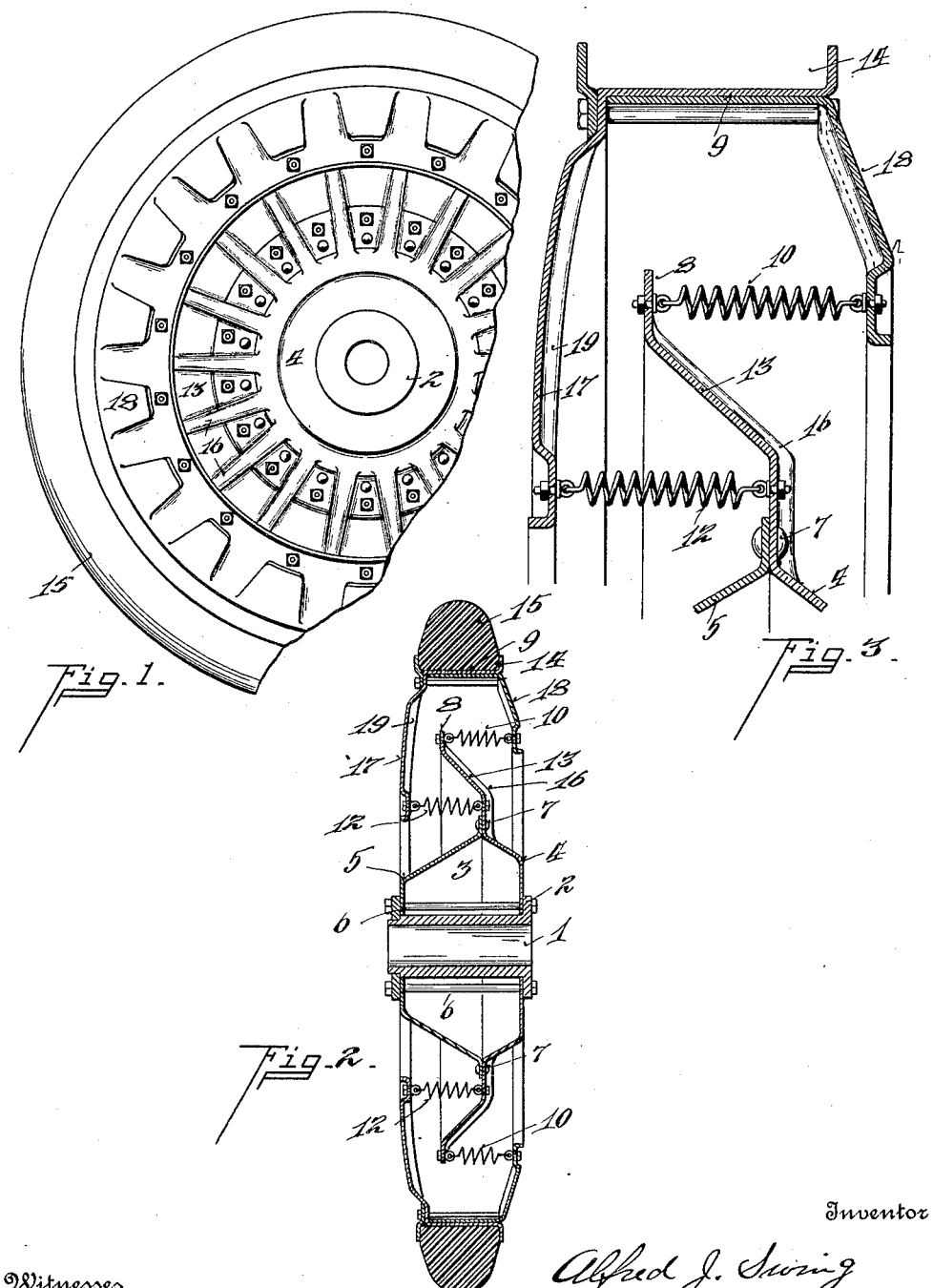

ALFRED J. SWING, OF CINCINNATI, OHIO.

WHEEL.

1,089,601.   Specification of Letters Patent.   Patented Mar. 10, 1914.

Application filed March 18, 1912. Serial No. 684,517.

*To all whom it may concern:*

Be it known that I, ALFRED J. SWING, a citizen of the United States, residing at Cincinnati, in the county of Hamilton and State of Ohio, have invented certain new and useful Improvements in Wheels, of which the following is a specification.

My invention relates to a resilient wheel construction for vehicles.

The object of the invention is to provide a cheap, durable and efficient device.

The features of my invention will be more fully set forth in the description of the accompanying drawings, forming a part of this specification, in which:—

Figure 1 is a broken side view. Fig. 2 is a central vertical section. Fig. 3 is a partially sectional view on a central vertical plane showing the upper half of the wheel.

1 represents the hub having annular flanges 2.

3 represents a circumferential hub member, it being a unitary structure formed of annular angle irons 4, 5, concentrically secured between hub flanges 2 by bolts 6. The in-turned margins of these irons meet at one side of the medial vertical line of the wheel plane and are secured together by rivets 7. One of these members 4 extends outwardly beyond the periphery of member 5, and is inclined still farther inwardly at its outer periphery 8 to lie upon the other side of said medial vertical line.

9 represents a circumferential rim member, one of the walls 18 of which projects centrally inward and terminates adjacent the periphery 8 of member 4, these peripheral margins being connected by coil springs 10. The other wall 17 projects inwardly and terminates adjacent and just beyond the periphery of member 3, being connected to a projecting portion of member 4 by coil springs 12. In this way the circumferential hub and rim members are connected together by two sets of springs disposed in concentric circles, springs 10 extending from member 4 to one side of the wheel, and springs 12 extending from member 4 to the other side of the wheel, the springs overlapping at their inner ends by reason of the incline portion 13 of member 4.

14 represents a rim trough for tire 15.

Preferably member 4 is provided with reinforcing radial ribs 16, and wall 17 has radial reinforcing ribs 19, these two sets of ribs being disposed between points of spring attachment. The spaces between walls 17 and the adjacent side of member 5, and between wall 18 and the adjacent side of member 4, are designed to be covered by dust shields not illustrated.

This mechanism is compact, durable and efficient, the two sets of springs arranged in different concentric circles providing ample and durable resilience, the springs overlapping in the medial vertical line of the wheel plane.

Having described my invention, I claim:—

1. A vehicle wheel comprising a circumferentially off-set hub member, a circumferential rim member, a concentric series of spring members jointedly attached at opposite ends and connecting the hub to one side of the rim member, and a different concentric series of spring members jointedly attached at opposite ends and connecting said hub member to the opposite side of said rim member, said two series of spring members being under opposed tension substantially parallel with each other, and the wheel axis and overlapping in the medial vertical line of the wheel plane.

2. A vehicle wheel comprising a circumferentially off-set hub member, a circumferential rim member having inwardly extending side walls with the peripheral portion of said hub member lying between said walls of the rim member and spring members arranged in opposed tension substantially parallel with the wheel axis in different concentric circles and jointedly secured at their opposite ends to said hub member and to the respective side walls of said rim member.

3. A vehicle wheel comprising a hub, a circumferential hub member attached to said hub, a circumferential rim member having inwardly extending side walls, one of which is projected farther than the other, the hub member having an angled portion lying between said walls, a series of concentrically arranged spiral springs under tension jointedly connecting the shorter side wall of the rim member to the outer portion of the hub member, and a second series of concentrically arranged spiral springs under tension jointedly connecting the longer wall of said rim member to the inner portion of said hub member, said respective series of springs being attached to the hub member with reference to the angled portion thereof so that said springs at their inner ends extend across the medial vertical line of the wheel plane.

4. A vehicle wheel comprising a hub, an outwardly projecting hub member united to opposite ends of said hub and off-set at separate sections circumferentially to provide a plurality of points for spring attachment upon opposite sides of the medial vertical line of the wheel plane, a rim member comprising two sections united to form an annular tire channel with inwardly projecting side walls on opposite sides of said projecting hub member, and spring members jointedly connected to said projecting hub member at said respective points of attachment at one end and jointedly connected to the respective side walls of said rim member so that said spring members will overlap at the medial vertical line of the wheel plane.

5. A vehicle wheel comprising a hub, an outwardly projecting hub member united to and encircling said hub, said hub member being off-set at separate sections circumferentially to provide a plurality of points for spring attachment upon opposite sides of the medial vertical plane of the wheel, a rim member comprising a tire channel and inwardly projecting walls on opposite sides of said projecting hub member, springs opposed to each other and in different concentric arrangement on opposite sides of said projecting hub member, said springs being jointedly connected at opposite ends to said projecting hub member and said respective side walls of said rim member, and said projecting hub member being in position to contact with either the rim or side wall of said rim member under excessive strain.

6. A vehicle wheel comprising a hub, an outwardly projecting hub member united to and encircling said hub, a rim member composed of a section forming integrally the base and inner flange of a tire channel and an inwardly projecting wall on the outside of said projecting hub member, a section underlapping said first named section at the base of the tire channel and forming an inwardly projecting wall for said rim on the inside of said projecting hub member, and a section forming an outer flange for said tire channel, said rim member being supported relative to said hub by means of springs under opposed tension jointedly connected at one end to said projecting hub member and jointedly connected at their opposite ends to the respective side walls of said rim member.

In testimony whereof, I have hereunto set my hand.

ALFRED J. SWING.

Witnesses:
OLIVER B. KAISER,
CLARENCE B. FOSTER.

---

Copies of this patent may be obtained for five cents each, by addressing the "Commissioner of Patents, Washington, D. C."